(12) United States Patent
Green

(10) Patent No.: US 8,463,131 B1
(45) Date of Patent: Jun. 11, 2013

(54) METHOD AND APPARATUS FOR CONVEYING TIMING INFORMATION

(75) Inventor: Samuel I. Green, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 12/968,502

(22) Filed: Dec. 15, 2010

(51) Int. Cl.
*H04B 10/00* (2006.01)
*H04B 10/04* (2006.01)

(52) U.S. Cl.
USPC ............ 398/115; 398/121; 398/154; 398/185

(58) Field of Classification Search
USPC ................. 398/115, 116, 121, 124, 125, 154, 398/155, 182, 183, 185
See application file for complete search history.

(56) References Cited

U.S. PATENT DOCUMENTS

| | | | | |
|---|---|---|---|---|
| 6,107,954 | A * | 8/2000 | Li ................................... | 342/54 |
| 6,738,713 | B2 * | 5/2004 | Pratt ............................ | 701/483 |
| 7,116,917 | B2 * | 10/2006 | Miyamoto et al. ............ | 398/185 |
| 7,333,727 | B2 * | 2/2008 | Fez et al. ....................... | 398/78 |
| 7,349,636 | B2 * | 3/2008 | Zitelli ........................... | 398/185 |
| 7,558,356 | B2 * | 7/2009 | Pollman et al. ............... | 375/367 |
| 2007/0274733 | A1 | 11/2007 | Shpantzer et al. | |
| 2009/0080899 | A1 | 3/2009 | Fowler et al. | |

OTHER PUBLICATIONS

Weston, "GPS Navigation Satellite message format and protocol details", Weston's GPS Sattelite Information, Mar. 4, 1999, pp. 1-2.
"GPS Serial Communications", GPS Serial Communications, pp. 1-2, retrieved Nov. 22, 2010 boondog.com/tutorials/gps/gps.html.
Charkhandeh, "X86-Based Real Time L1 GPS Software Receiver", Apr. 2007, Geomatics Engineering, UCGE Reports No. 20253, pp. 1-107.
"IRIG Time Code Formats", Meinberg Solutions for Time and frequency Synchronization, retrieved Nov. 22, 2010, pp. 1-6 www.meinberg.de/english/info/irig.htm.
"Case Study 011—GPS Signal Re-Radiating in Tunnel Networks", ViaLite, pp. 1-2, retrieved Dec. 13, 2010 http://www.vialite-usa.com/pdf/ViaLite%020-%20Case%20Study%020011%20-%20GPS%20in%20Tunnels.pdf.
"GPS Signals Transported over Cable Runs up to 10km—GPS over Fibre Solution from Chronos", Chronos Technology, pp. 1-2, retrieved Dec. 13, 2010 www.chronos.co.uk.

* cited by examiner

*Primary Examiner* — Dalzid Singh
(74) *Attorney, Agent, or Firm* — Yee & Associates, P.C.

(57) ABSTRACT

A method and apparatus for sending timing information using an optical signal. A first electrical signal comprising a pseudorandom binary sequence is generated. The first electrical signal comprising the pseudorandom binary sequence is modulated with a second electrical signal to form a modulated electrical signal. The second electrical signal includes timing data in a format used for global positioning systems. An optical carrier signal is modulated with the modulated electrical signal to form the optical signal using an optical transmitter.

20 Claims, 2 Drawing Sheets

METHOD AND APPARATUS FOR CONVEYING TIMING INFORMATION

BACKGROUND INFORMATION

1. Field

The present disclosure relates generally to timing information and, in particular, to sending timing information in signals. Still more particularly, the present disclosure relates to sending timing information in optical signals.

2. Background

Digital communications are being used more and more to transmit data. Digital communication is the physical transfer of data over a communications channel. Communications channels may include, for example, without limitation, a wire, an optical fiber, a wireless communications channel, and/or some other suitable type of communications channel.

The data transferred over the communications channel is a digital series of bits impressed on an electromagnetic signal. For example, the electromagnetic signal may be an electrical voltage signal, a radio frequency signal, a microwave signal, an optical signal, an infrared signal, or some other suitable type of signal.

Timing information is an example of data that may be sent using digital communications. Typically, with currently available systems, timing information is sent using electrical wires, radio waves, and/or optical fibers. For example, in some applications, the timing information may be in the form of the leading edge or the trailing edge of an electrical or optical waveform or narrow pulse.

Optical communications using optical signals allow data to be transmitted at higher rates, as compared to using other forms of digital communications, such as radio waves or electrical wires. The higher rates for data transmission provide better resolution of the timing information.

Further, optical fibers used in optical communications reduce susceptibility of the transmission of data to electromagnetic interference. Optical communications also generate less electromagnetic interference and, thus, interfere less with other circuitry that is susceptible to electromagnetic interference.

However, currently available systems for sending timing information using optical signals may not provide the desired precision in the timing information.

Therefore, it would be advantageous to have a method and apparatus that takes into account at least some of the issues discussed above, as well as possibly other issues.

SUMMARY

In one advantageous embodiment, a method is provided for sending timing information using an optical signal. A first electrical signal comprising a pseudorandom binary sequence is generated. The first electrical signal comprising the pseudorandom binary sequence is modulated with a second electrical signal to form a modulated electrical signal. The second electrical signal includes timing data in a format used for global positioning systems. An optical carrier signal is modulated with the modulated electrical signal to form the optical signal using an optical transmitter.

In another advantageous embodiment, an apparatus comprises a signal generator and an optical transmitter. The signal generator is configured to generate a first electrical signal comprising a pseudorandom binary sequence. The signal generator is configured to modulate the first electrical signal comprising the pseudorandom binary sequence with a second electrical signal to form a modulated electrical signal. The second electrical signal includes timing data in a format used for global positioning systems. The optical transmitter is configured to modulate an optical carrier signal with the modulated electrical signal to form an optical signal.

In yet another advantageous embodiment, a method is provided for deriving timing information. An optical signal, from which the timing information is derived, is received at an optical receiver. The optical signal is generated by modulation of an optical carrier signal with a modulated electrical signal. The modulated electrical signal is formed by modulation of a first electrical signal comprising a pseudorandom binary sequence with a second electrical signal. The second electrical signal includes timing data in a format used for global positioning systems. The optical signal is converted into a third electrical signal using the optical receiver. The timing information is derived by a signal receiver using the third electrical signal and a copy of the pseudorandom binary sequence.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
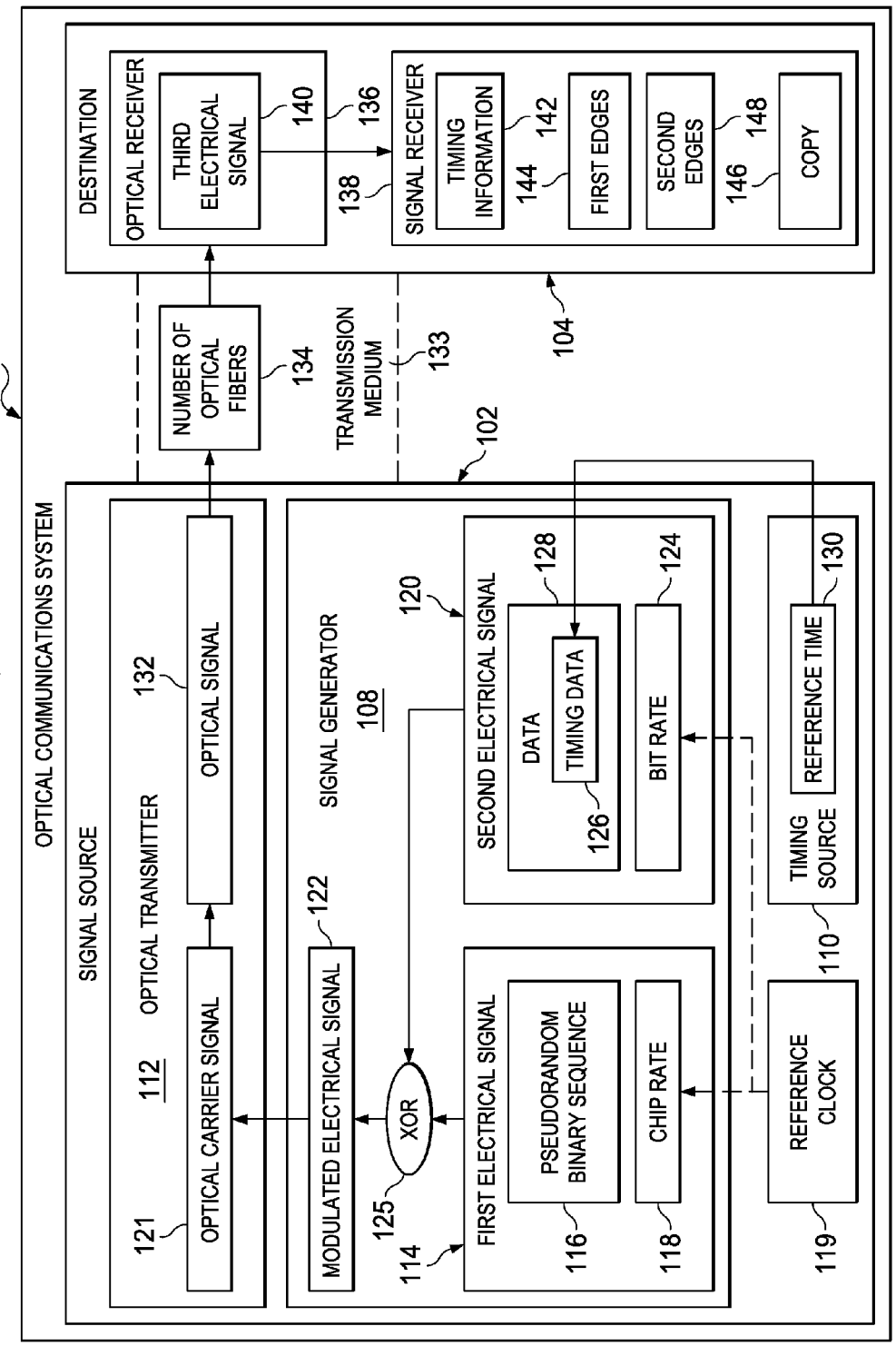
FIG. 1 is an illustration of a block diagram of an optical communications system used for sending timing information in accordance with an advantageous embodiment.

The different advantageous embodiments recognize and take into account a number of different considerations. For example, the different advantageous embodiments recognize and take into account that optical communications may be preferred over electronic communications, because optical communications may support a higher bandwidth than electronic systems.

Optical communications involve transmitting data through a transmission medium from an optical transmitter to an optical receiver using an optical signal. The transmission medium may be, for example, a number of optical fibers, glass, plastic, free space, air, or some other suitable transmission medium.

A number, as used herein, means one or more items. For example, a number of optical fibers are one or more optical fibers. An optical fiber may also be referred to as a fiber optic cable. The optical transmitter, number of optical fibers, and optical receiver used to send the data form a fiber optic data link.

The different advantageous embodiments recognize and take into account that it may be desirable to send timing information across a fiber optic data link using timing references. For example, narrow pulses or the edges of rectangular waves may be used as timing references. However, using narrow pulses or the edges of rectangular waves as timing references may not provide the desired duty cycle balance in the short term. In other words, the duty cycle of the waveform comprising the narrow pulses or the rectangular waves may not be substantially about 50 percent over a short enough period to reduce and/or avoid temperature drift of the optical transmitter, waveform droop, or baseline wander in the receiver. Such fiber optic data links require specialized optical transmitters and optical receiver circuitry.

The different advantageous embodiments recognize and take into account that methods for sending information in optical fibers may not have a desired performance with waveforms that are not on and off with about a 50 percent duty cycle on a short-term basis. In particular, fiber optic data links operate best with data that has about a 50 percent duty cycle on a short-term basis. The different advantageous embodiments recognize and take into account that the duty cycle may cause temperature changes, receiver bias offsets during long bit periods, and/or other effects.

The different advantageous embodiments recognize and take into account that higher speeds of data transmission may provide about a 50 percent duty cycle over a shorter time period, as compared to lower speeds of data transmission. Further, with higher speeds of data transmission, the different advantageous embodiments recognize and take into account that it may be desirable to use timing data in a format used with global positioning systems for timing information, as compared to a timing reference.

The different advantageous embodiments recognize and take into account that the protocol used for sending global positioning system signals may be used to send timing information in optical signals carried in optical fibers. This protocol includes a number of codes for sending timing information. The protocol used for sending the global positioning system signals provides a method for sending timing information with precision as high as the global positioning system.

Thus, the different advantageous embodiments provide a method and apparatus for sending timing information using optical signals. In one advantageous embodiment, a method is provided for sending timing information using optical signals. A first electrical signal comprising a pseudorandom binary sequence is generated. The first electrical signal has a chip rate. The first electrical signal comprising the pseudorandom binary sequence is modulated with a second electrical signal to form a modulated electrical signal. The second electrical signal has a bit rate and includes timing data in a format used for global positioning systems.

An optical carrier signal is modulated with the modulated electrical signal to modulate light on and off based on the modulated electrical signal to form an optical signal using an optical transmitter. The optical signal is transmitted through a transmission medium from the optical transmitter to an optical receiver. The optical signal is converted into a third electrical signal using the optical receiver. The timing information is derived using the third electrical signal using a signal receiver.

With reference now to FIG. 1, an illustration of a block diagram of an optical communications system is depicted in accordance with an advantageous embodiment. In these illustrative examples, optical communications system 100 is an example of a system in which the different advantageous embodiments may be implemented. As depicted, optical communications system 100 includes signal source 102 and destination 104. Signal source 102 is configured to send optical signals to destination 104.

As depicted, signal source 102 includes signal generator 108, timing source 110, and optical transmitter 112. Signal generator 108 generates first electrical signal 114. First electrical signal 114 comprises pseudorandom binary sequence (PRBS) 116. Pseudorandom binary sequence 116 may also be referred to as a pseudorandom code, a pseudo-noise code, or a gold code. In particular, signal generator 108 may generate first electrical signal 114 comprising pseudorandom binary sequence 116 in a manner substantially identical to the manner in which global positioning system signals are generated.

Currently, global positioning systems use a pseudorandom binary sequence as a coarse acquisition code (C/A code) and/or precision code (P-code) for sending global positioning system signals. The precision code may also be referred to as a precise code. A pseudorandom binary sequence is an N-sequence of bits that is random in a sense that the value of a bit is independent of the value of any of the other bits. N is the number of bits in the sequence. However, the pseudorandom binary sequence is "pseudo" in that the sequence is deterministic and the sequence repeats itself after every N bits.

In these illustrative examples, pseudorandom binary sequence 116 may be the coarse acquisition code used for global positioning systems. In particular, pseudorandom binary sequence 116 is a sequence of about 1023 chips. Each chip is a logical one or logical zero in these illustrative examples. First and second selected electrical voltages, within selected tolerances, represent logical ones and logical zeroes, respectively, in pseudorandom binary sequence 116. The first and second selected electrical voltages may be selected based on industry standards for binary logic electrical voltage levels. Each chip is a rectangular pulse in pseudorandom binary sequence 116 and does not contain data.

First electrical signal 114 has chip rate 118 for pseudorandom binary sequence 116. Chip rate 118 is about 1.023 million chips per second or about 1.023 megachips per second in this illustrative example. This chip rate corresponds to the coarse acquisition code used with global positioning systems. In this manner, pseudorandom binary sequence 116 repeats about every 1023 chips or about every one millisecond. As depicted, chip rate 118 for first electrical signal 114 is synchronized with reference clock 119. In other illustrative examples, first electrical signal 114 may have some other chip rate depending on the implementation.

Additionally, in these illustrative examples, pseudorandom binary sequence 116 has a duty cycle of about 50 percent. In this manner, first electrical signal 114 comprising pseudorandom binary sequence 116 has a duty cycle of about 50 percent.

Signal generator 108 modulates first electrical signal 114 with second electrical signal 120 to form modulated electrical signal 122. Second electrical signal 120 has bit rate 124. Bit rate 124 is about 50 bits per second. In this manner, second electrical signal 120 is a continuous bit stream of about 50 bits per second. Signal generator 108 may form modulated electrical signal 122 in a manner substantially identical to the manner in which global positioning system signals are generated. In other illustrative examples, bit rate 124 may have some other suitable value.

In these illustrative examples, signal generator 108 modulates first electrical signal 114 with second electrical signal 120 by performing exclusive-OR function 125 using first electrical signal 114 and second electrical signal 120 to form modulated electrical signal 122. Using exclusive-OR function 125 to perform the modulation inverts first electrical signal 114 when second electrical signal 120 is a logical one and does not invert second electrical signal 120 when second electrical signal 120 is a logical zero to form modulated electrical signal 122.

In these illustrative examples, signal generator 108 transmits data 128 in second electrical signal 120 in a format that is used with global positioning systems. For example, data 128 is transmitted in logical units called frames or data frames. Each frame has a length of about 1500 bits. Further, each frame comprises five sub-frames. Each sub-frame has a length of about 300 bits. Data 128 is transmitted at bit rate 124 such that a sub-frame is transmitted about every six seconds, and a frame is transmitted about every about 30 seconds.

Additionally, each bit in data 128 has a length of about 20 milliseconds. In this manner, about 20 repetitions of pseudorandom binary sequence 116 are present in one bit of data 128 in modulated electrical signal 122. In these examples, the repetitions of pseudorandom binary sequence 116 all have the same state of inversion or non-inversion for the length of each bit in data 128 in modulated electrical signal 122. At the transition from one bit to another bit, the state of inversion of pseudorandom binary sequence 116 may change such that all repetitions of pseudorandom binary sequence 116 for the next bit have the new state of inversion.

Further, bit rate 124 may also be synchronized with reference clock 119 such that the transition from one frame to another frame occurs at substantially the same time as a transition from one repetition of pseudorandom binary sequence 116 to another.

At least a portion of the sub-frames in the frames in data 128 includes timing data 126. "At least a portion" is one, some, or all of the sub-frames. In these illustrative examples, all of the sub-frames include timing data 126. Timing data 126 for each sub-frame indicates the time at which the next sub-frame begins.

In particular, timing data 126 identifies reference time 130. Signal generator 108 obtains reference time 130 from timing source 110 to generate second electrical signal 120 having timing data 126. Timing source 110 may be, for example, without limitation, an atomic clock or some other suitable type of clock configured to maintain time. An atomic clock may be configured to maintain the International Atomic Time (TAI) scale, the Coordinated Universal Time (UTC) scale for time, Global Positioning System (GPS) time, or some other suitable form of time. In these illustrative examples, timing source 110 may be the same type of timing source used with global positioning systems, and reference time 130 may have the same format used with global positioning systems.

In these depicted examples, signal generator 108 modulates first electrical signal 114 with second electrical signal 120 to encode timing data 126 in first electrical signal 114 such that timing data 126 can be transmitted to destination 104. In this manner, modulated electrical signal 122 includes timing data 126.

Signal generator 108 sends modulated electrical signal 122 to optical transmitter 112. Optical transmitter 112 may be any device configured to receive an electrical signal at its input, process this signal, and use the signal to modulate an optoelectronic device to produce an optical signal capable of being transmitted via an optical transmission medium. The optoelectronic device may be, for example, a light-emitting diode (LED), a laser diode, or some other suitable type of device. The optical transmission medium may be, for example, an optical fiber, also referred to as a fiber optic cable.

Optical transmitter 112 receives modulated electrical signal 122 and modulates optical carrier signal 121 with modulated electrical signal 122 to modulate light on and off based on modulated electrical signal 122 to form optical signal 132.

In particular, optical transmitter 112 modulates optical carrier signal 121 using amplitude modulation on and off keying. Further, optical transmitter 112 turns optical carrier signal 121 on and off based on the state of modulated electrical signal 122.

As one illustrative example, logical ones in modulated electrical signal 122 may modulate light on, and logical zeros may modulate light off. In other illustrative examples, logical ones may modulate light off, and logical zeros may modulate light on.

In these depicted examples, optical signal 132 is transmitted from optical transmitter 112 through transmission medium 133 to destination 104. Transmission medium 133 takes the form of number of optical fibers 134 in these examples. A number, as used herein, means one or more items. For example, a number of optical fibers are one or more optical fibers. In particular, number of optical fibers 134 is one or more concatenated optical fibers.

Destination 104 includes optical receiver 136 and signal receiver 138. Optical receiver 136 is configured to receive optical signal 132 through number of optical fibers 134. Optical receiver 136 converts optical signal 132 back into third electrical signal 140. Third electrical signal 140 is a restored version of modulated electrical signal 122. In other words, third electrical signal 140 may be a copy of modulated electrical signal 122 that is substantially the same as modulated electrical signal 122 within a tolerance. Optical receiver 136 sends third electrical signal 140 to signal receiver 138.

In these illustrative examples, signal receiver 138 uses third electrical signal 140 to extract timing information 142 from third electrical signal 140. In other words, signal receiver 138 derives timing information 142 using third electrical signal 140, which is a copy of modulated electrical signal 122. Timing information 142 is derived by extracting timing data 126 and using the edges of first electrical signal 114 that correspond to the starts of sub-frames in second electrical signal 120.

For example, signal receiver 138 identifies first edges 144 in copy 146 of pseudorandom binary sequence 116 that correspond to second edges 148 in second electrical signal 120. Second edges 148 are the starts of sub-frames or the transitions between sub-frames. First edges 144 are the portion of the edges in copy 146 of pseudorandom binary sequence 116 that aligns with second edges 148. The edges for pseudorandom binary sequence 116 are the starts of chips or the transitions between chips.

In these illustrative examples, copy 146 of pseudorandom binary sequence 116 may be, for example, locally generated by signal receiver 138. Further, copy 146 is substantially identical to pseudorandom binary sequence 116.

Additionally, in deriving timing information 142, signal receiver 138 may take into account timing delays caused by the transmission of optical signal 132 over transmission medium 133 and/or other timing delays to derive timing information 142 with a desired accuracy.

Additionally, in other illustrative examples, the precision code used for global positioning systems may be used in addition to the coarse acquisition code. In these illustrative examples, the precision code has a higher chip rate and a longer length than the coarse acquisition code. In this manner, the precision code provides greater precision than the coarse acquisition code. Using the precision code along with the coarse acquisition code may provide a greater accuracy in timing information 142, as compared to using the coarse acquisition code.

In still other illustrative examples, more than one optical signal may be formed using more than one pseudorandom binary sequence to send timing information 142. For example, both a precision code and a coarse acquisition code may be used to form respective optical signals having two different wavelengths.

Signal receiver 138 may be implemented using any number of devices. In particular, signal receiver 138 may be implemented using hardware, firmware, and/or software components used in devices configured to receive global positioning system signals. For example, signal receiver 138 may be implemented using a code division multiple access (CDMA) receiver used with global positioning systems. In this manner, timing information 142 can be sent from signal source 102 to destination 104 with high precision using optical signals instead of microwaves.

The illustration of optical communications system 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, signal source 102 may include optical transmitters in addition to or in place of optical transmitter 112. Similarly, destination 104 may include optical receivers in addition to or in place of optical receiver 136. For example, the different components in optical communications system 100 may be configured to send the same timing information to multiple destinations.

As one illustrative example, a fiber optic element may be configured to split optical signal 132 from optical transmitter 112 into multiple paths to multiple respective optical receivers. As another illustrative example, multiple optical transmitters may be configured to send corresponding optical signals to respective multiple optical receivers.

In still other illustrative examples, transmission medium 133 may be some other medium other than optical fibers. For example, transmission medium 133 may be selected from one of glass, plastic, water, air, and/or free space.

Figure 2:
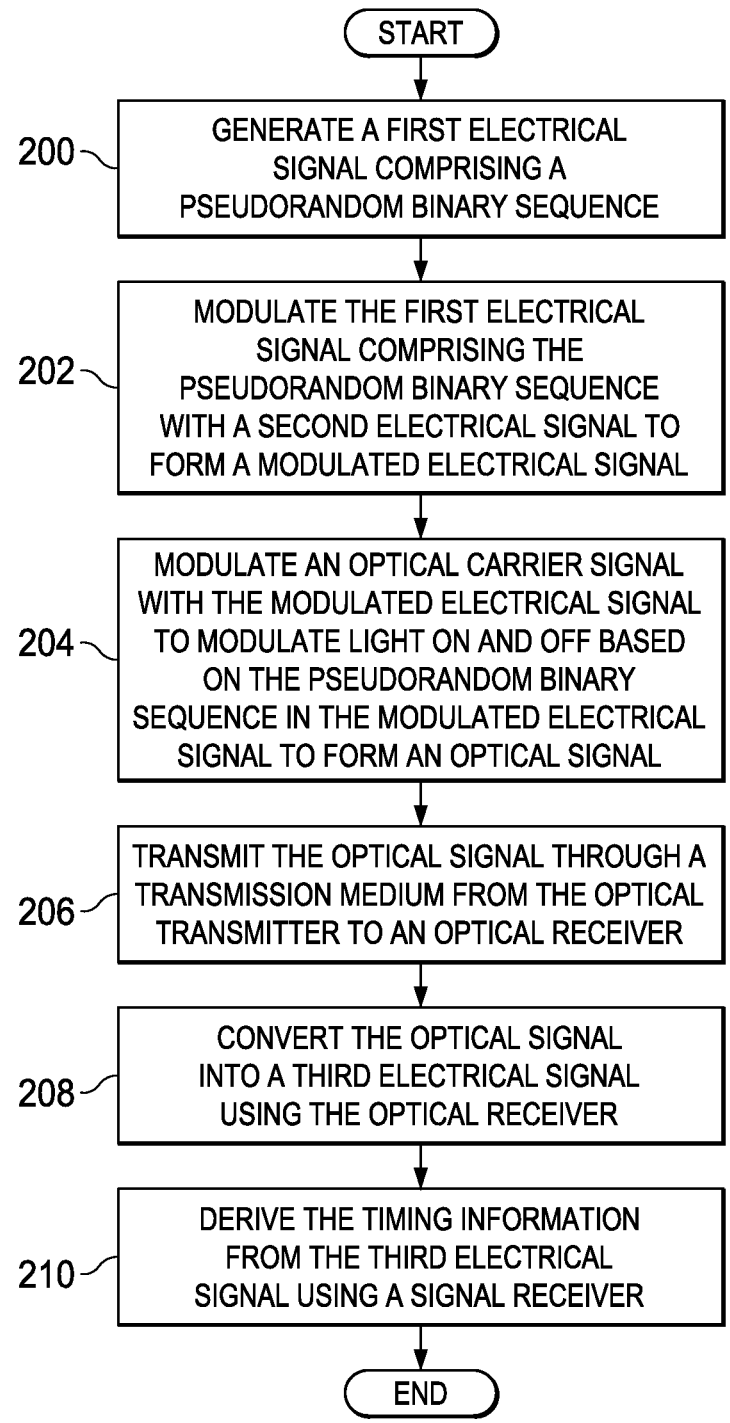
FIG. 2 is an illustration of a flowchart of a process for sending timing information using optical signals in accordance with an advantageous embodiment.

With reference now to FIG. 2, an illustration of a flowchart of a process for sending timing information using optical signals is depicted in accordance with an advantageous embodiment. The process illustrated in FIG. 2 may be implemented using optical communications system 100 in FIG. 1.

The process begins by generating a first electrical signal comprising a pseudorandom binary sequence (operation 200). The first electrical signal has a chip rate of about 1.023 megachips per second. Then the process modulates the first electrical signal comprising the pseudorandom binary sequence with a second electrical signal to form a modulated electrical signal (operation 202). The second electrical signal has a bit rate of about 50 bits per second. Further, the second electrical signal includes timing data.

In operation 202, modulation may be performed using an exclusive-OR function such that the second electrical signal having the 50 bits per second bit rate inverts the logical data in the first electrical signal having about 1.023 megachips per second chip rate when about 50 bits per second data is in the logical one state but not when in the logical zero state to form the modulated electrical signal.

The process then modulates an optical carrier signal with the modulated electrical signal to modulate light on and off based on the pseudorandom binary sequence in the modulated electrical signal to form an optical signal (operation 204). Operation 204 is performed using an optical transmitter.

Thereafter, the process transmits the optical signal through a transmission medium from the optical transmitter to an optical receiver (operation 206). The transmission medium may be, for example, without limitation, a number of optical fibers.

The process converts the optical signal into a third electrical signal using the optical receiver (operation 208). The process then derives the timing information from the third electrical signal using a signal receiver (operation 210), with the process terminating thereafter. The process described in FIG. 2 may be repeated continuously in these illustrative examples.

The flowchart and block diagram in the different depicted embodiments illustrate the architecture, functionality, and operation of some possible implementations of apparatus and methods in different advantageous embodiments. In this regard, each block in the flowchart or block diagram may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments and the practical application, and to enable others of ordinary skill in the art to understand the disclosure for various embodiments with various modifications as are suited to the particular use contemplated.

What is claimed is:

1. A method for sending timing information using an optical signal, the method comprising:
   generating a first electrical signal comprising a pseudorandom binary sequence;
   modulating the first electrical signal comprising the pseudorandom binary sequence with a second electrical signal to form a modulated electrical signal, wherein the second electrical signal includes timing data in a format used for global positioning systems; and
   modulating, by an optical transmitter, an optical carrier signal with the modulated electrical signal to form the optical signal.

2. The method of claim 1 further comprising:
   transmitting the optical signal through a transmission medium from the optical transmitter to an optical receiver;
   converting the optical signal into a third electrical signal using the optical receiver; and
   deriving, by a signal receiver, the timing information using the third electrical signal.

3. The method of claim 2, wherein the transmission medium is selected from a group comprising a number of optical fibers, glass, plastic, air, and free space.

4. The method of claim 2, wherein the step of deriving, by the signal receiver, the timing information using the third electrical signal comprises:
   extracting the timing data from the third electrical signal;

identifying edges in the first electrical signal; and forming the timing information using the timing data that is extracted and the edges identified.

5. The method of claim 4, wherein the timing data is a portion of data in the second electrical signal, wherein the timing data is transmitted in frames in which a frame has a length of about 1500 bits and five sub-frames in which a sub-frame has a length of about 300 bits, and wherein the timing data is included in at least a portion of the five sub-frames.

6. The method of claim 2, wherein the third electrical signal is a copy of the modulated electrical signal and wherein the step of deriving, by the signal receiver, the timing information using the third electrical signal comprises:

demodulating the copy of the modulated electrical signal to extract a copy of the second electrical signal from the copy of the modulated electrical signal;

identifying first edges in a copy of the pseudorandom binary sequence that correspond to second edges in the second electrical signal; and deriving the timing information using the timing data in the copy of the second electrical signal and the first edges of the copy of the pseudorandom binary sequence.

7. The method of claim 1, wherein the first electrical signal has a chip rate of about 1.023 million chips per second and the second electrical signal has a bit rate of about 50 bits per second and wherein the pseudorandom binary sequence comprises about 1023 chips, repeats about every millisecond at the chip rate, repeats about 20 times per bit, and has a duty cycle of about 50 percent.

8. The method of claim 1, wherein the pseudorandom binary sequence is used as at least one of a coarse acquisition code and a precision code for a global positioning system.

9. The method of claim 1, wherein modulating the first electrical signal with the second electrical signal encodes the timing data in the first electrical signal and wherein the timing data is formed using a reference time obtained from a timing source.

10. The method of claim 1, wherein the optical carrier signal is modulated with the modulated electrical signal using amplitude modulation on and off keying.

11. The method of claim 1, wherein the step of modulating, by the optical transmitter, the optical carrier signal with the modulated electrical signal to form the optical signal comprises:

modulating, by the optical transmitter, the optical carrier signal with the modulated electrical signal to modulate light on and off based on the modulated electrical signal to form the optical signal, wherein the second electrical signal includes the timing data in the format used for the global positioning systems.

12. An apparatus comprising:

a signal generator configured to generate a first electrical signal comprising a pseudorandom binary sequence; and modulate the first electrical signal comprising the pseudorandom binary sequence with a second electrical signal to form a modulated electrical signal, wherein the second electrical signal includes timing data in a format used for global positioning systems; and an optical transmitter configured to modulate an optical carrier signal with the modulated electrical signal to form an optical signal.

13. The apparatus of claim 12 further comprising:

a transmission medium;

an optical receiver configured to receive the optical signal in which the optical signal is transmitted through the transmission medium from the optical transmitter to the optical receiver; and convert the optical signal into a third electrical signal; and a signal receiver configured to derive the timing information using the third electrical signal.

14. The apparatus of claim 13, wherein the signal receiver is configured to extract the timing data from the third electrical signal; identify edges in the first electrical signal; and form the timing information using the timing data that is extracted and the edges identified when deriving the timing information.

15. The apparatus of claim 13, wherein the third electrical signal is a copy of the modulated electrical signal and wherein the signal receiver is configured to demodulate the copy of the modulated electrical signal to extract a copy of the second electrical signal from the copy of the modulated electrical signal; identify first edges in a copy of the pseudorandom binary sequence that corresponds to second edges in the second electrical signal; and derive the timing information using the timing data in the copy of the second electrical signal and the first edges of the copy of the pseudorandom binary sequence.

16. The apparatus of claim 12, wherein the first electrical signal has a chip rate of about 1.023 million chips per second and the second electrical signal has a bit rate of about 50 bits per second; wherein the pseudorandom binary sequence comprises about 1023 chips, repeats about every millisecond at the chip rate, repeats about 20 times per bit, and has a duty cycle of about 50 percent; and wherein the timing data is a portion of data in the second electrical signal and is transmitted in frames in which a frame has a length of about 1500 bits and five sub-frames in which a sub-frame has a length of about 300 bits, and wherein the timing data is included in at least a portion of the five sub-frames.

17. The apparatus of claim 12, wherein the pseudorandom binary sequence is used as at least one of a coarse acquisition code and a precision code for a global positioning system.

18. The apparatus of claim 12, wherein modulating the first electrical signal with the second electrical signal encodes the timing data in the first electrical signal and wherein the optical carrier signal is modulated with the modulated electrical signal using amplitude modulation on and off keying.

19. A method for deriving timing information, the method comprising:

receiving an optical signal, from which the timing information is derived, at an optical receiver in which the optical signal is generated by modulation of an optical carrier signal with a modulated electrical signal, wherein the modulated electrical signal is formed by modulation of a first electrical signal comprising a pseudorandom binary sequence with a second electrical signal in which the second electrical signal includes timing data in a format used for global positioning systems;

converting the optical signal into a third electrical signal using the optical receiver; and deriving, by a signal receiver, the timing information using the third electrical signal and a copy of the pseudorandom binary sequence.

20. The method of claim 19, wherein the third electrical signal is a copy of the modulated electrical signal and wherein the step of deriving, by the signal receiver, the timing information using the third electrical signal and the copy of the pseudorandom binary sequence comprises:

demodulating the copy of the modulated electrical signal to extract a copy of the second electrical signal from the copy of the modulated electrical signal;

identifying first edges in the copy of the pseudorandom binary sequence that correspond to second edges in the second electrical signal; and deriving the timing information using the timing data in the copy of the second electrical signal and the first edges of the copy of the pseudorandom binary sequence.

\* \* \* \* \*